United States Patent [19]

Carlin et al.

[11] 4,214,999

[45] Jul. 29, 1980

[54] SURFACTANT FLOODING OIL RECOVERY PROCESS

[75] Inventors: Joseph T. Carlin, Houston, Tex.; James W. Ware, Tulsa, Okla.; Melvin E. Mills, Jr., Salem, Ill.; Timothy N. Tyler, Houston, Tex.

[73] Assignee: Texaco Inc., White Plains, N.Y.

[21] Appl. No.: 888,444

[22] Filed: Mar. 20, 1978

Related U.S. Application Data

[63] Continuation of Ser. No. 746,642, Dec. 1, 1976, abandoned.

[51] Int. Cl.$^2$ .............................................. E21B 43/22
[52] U.S. Cl. ............................... 252/8.55 D; 166/274; 166/275
[58] Field of Search .................. 252/8.55 D; 166/273, 166/274, 275

[56] References Cited

U.S. PATENT DOCUMENTS

| | | | |
|---|---|---|---|
| 3,467,190 | 9/1969 | Dunlap et al. | 166/274 X |
| 3,468,377 | 9/1969 | Dunlap et al. | 166/274 |
| 3,508,612 | 4/1970 | Reisberg et al. | 166/274 |
| 3,623,553 | 11/1971 | Burdge | 166/274 |
| 3,792,731 | 2/1974 | Feuerbacher et al. | 166/274 |
| 3,827,497 | 8/1974 | Dycus et al. | 252/8.55 X |

Primary Examiner—Herbert B. Guynn
Attorney, Agent, or Firm—Carl G. Ries; Thomas H. Whaley; Jack H. Park

[57] ABSTRACT

Disclosed is a novel aqueous surfactant-containing fluid suitable for use in surfactant flooding oil recovery processes, and an oil recovery process using the fluid. The fluid contains petroleum sulfonates alone or in combination with solubilizing co-surfactants such as ethoxylated alkyl or alkylaryl compounds, alkyl or alkylaryl polyethoxy sulfates, or alkyl or alkylaryl polyethoxy sulfonates. The petroleum sulfonate is a mixture of petroleum sulfonates of varying equivalent weights ranging from 250 to 700, with an average equivalent weight between 325 and 425 and preferably between 350 and 400. Additionally, the distribution of equivalent weights is relatively uniform, with from 40 to 70 percent being less than 400 and from 60 to 30 percent of the petroleum sulfonates having equivalent weights being 400 or greater; and preferably from 15 to 35 percent of the petroleum sulfonates having equivalent weights less than 350, and 30 to 50 percent having equivalent weights from 350 to less than 500 and from 10 to 40 percent of the petroleum sulfonates having equivalent weights of 500 and above. The especially preferred embodiment employs a mixture of petroleum sulfonates in which 5 to 15 percent have equivalent weights less than 300, from 25 to 50 percent have equivalent weights the range of from about 300 to less than 400, from 15 to 25 percent fall in the range of from about 400 to less than 500 and from 5 to 20 percent have equivalent weights greater than 500.

3 Claims, No Drawings

SURFACTANT FLOODING OIL RECOVERY PROCESS

This is a continuation of application Ser. No. 746,642, filed Dec. 1, 1976, now abandoned.

BACKGROUND OF THE INVENTION

1. Field of the Invention

This invention is concerned with a novel surfactant-containing fluid and an oil recovery method employing the fluid and more particularly is concerned with a novel surfactant fluid and oil recovery method employing the fluid wherein the fluid contains a mixture of petroleum sulfonates having specified even equivalent weight distribution.

2. Description of the Prior Art

It is well known to persons skilled in the art of recovery of petroleum from subterranean petroleum containing formations that only from about 10 to about 50 percent of the oil originally present in a subterranean formation can be recovered by conventional primary recovery means and by waterflooding. Substantial additional oil may be recovered from the formation by injecting into the formation an aqueous surfactant-containing aqueous fluid for the purpose of reducing the interfacial tension between water and oil, thereby increasing the microscopic displacement efficiency of the aqueous displacing fluid over that obtainable with water or field brines alone. Petroleum sulfonate is a well known and commonly utilized surfactant for surfactant flooding enhanced oil recovery processes. Petroleum sulfonate may be employed in petroleum reservoirs containing water having relatively low salinity and divalent ion concentration, e.g. salinities less than from about 5000 to about 30,000 parts per million total dissolved solids and divalent ion concentrations less than about 500 parts per million, or in formations containing water having somewhat higher salinities and divalent ion concentrations if the formation is first preconditioned by injecting into the formation in advance of the surfactant fluid, a relatively fresh water preflush to displace the higher salinity and high hardness water from the flow channels of the formation prior to injecting the petroleum sulfonate-containing fluids.

The prior art also teaches the employment of various solubilizing co-surfactants in combination with petroleum sulfonates and other organic sulfonates in order to increase the usefulness of the organic sulfonates in formations containing higher salinities and divalent ion concentrations than those referred to above. For example, U.S. Pat. Nos. 3,792,731 and 3,811,505 deal with the use of mixtures of nonionic surfactants with petroleum sulfonates and other organic sulfonates for oil recovery in formations containing high hardness water. U.S. Pat. Nos. 3,811,504; 3,811,507; 3,508,612; 3,827,497; and 3,890,239 all deal with various surfactant combinations in which petroleum sulfonate or other organic sulfonates are combined with more complex synthetic surfactants which render the mixture more soluble in solutions of higher salinities and higher concentrations of divalent ions than could be tolerated by organic sulfonates including petroleum sulfonates alone.

While the foregoing processes are effective for surfactant flooding in formations, the cost of a surfactant fluid employing a synthetic surfactant as a solubilizing co-surfactant, is generally excessive in relationship to the quantity of additional oil to be recovered.

The prior art also recognizes that certain relationships exist between the equivalent weight of petroleum sulfonates employed and their effectiveness in certain formations. For example, U.S. Pat. Nos. 3,434,542 and 3,468,377 teach the use of petroleum sulfonates for oil recovery, the petroleum sulfonate being comprised of a mixture of petroleum sulfonates having different equivalent weights, specifying the range and the maximum percentage of species whose equivalent weights are less than 290 or greater than 590.

Despite the substantial teachings discussed above, the amount of enhanced oil recovery obtainable with petroleum sulfonates has usually been unsatisfactory, particularly from a commercial point of view, and the degree of recovery obtainable from petroleum sulfonates has not always been predictable with accuracy based on the gross equivalent weight characterizations contained in the prior art references. Accordingly, there is a substantial, unfulfilled commercial need for a method for accurate characterization of the petroleum sulfonates which will most effectively and efficiently recover oil from subterranean, oil-containing formations.

SUMMARY OF THE INVENTION

We have discovered that when petroleum sulfonates are used in oil recovery processes, whether used as substantially the only surface active agent in a surfactant fluid injected into the formation, or when the petroleum sulfonate is combined with more complex synthetic surfactants which function as solubilizing co-surfactants in order to permit the use of surfactant flooding techniques in formations containing relatively high salinity and/or high hardness water, optimum results are obtained if the average equivalent weight of the petroleum sulfonate utilized is lower than that which would have been predicted by interfacial tension measurements, and generally should be in the range of from about 325 to about 425 and preferably from about 350 to about 400. Moreover, the distribution of equivalent weight within the range of from about 250 to about 700 should be relatively uniform. For example, from about 40 to about 70 percent of the petroleum sulfonates should have equivalent weights of less than 400 and from about 60 to about 30 percent should have equivalent weights of 400 and above. Preferably, from about 15 to 35 percent should have equivalent weights of less than 350 with from 30 to 50 percent having equivalent weights from 350 to less than 500 and from 10 to 40 percent having equivalent weights of 500 or greater. The especially preferred embodiment employs a mixture of petroleum sulfonates having equivalent weights so evenly distributed that from 5 to 15 percent of the molecular species have equivalent weights less than 300; from 25 to 50 percent have equivalent weights of from 300 to less than 400; from 15 to 25 percent have equivalent weights from 400 to less than 500; and from 5 to 20 percent having equivalent weights of 500 and greater. These preferred ranges apply to processes in which petroleum sulfonate is utilized as substantially the only surface active agent in the aqueous surfactant fluid injected into a formation containing water having relatively low salinity and hardness values, e.g., salinities equal to or less than about 20,000 parts per million total dissolved solids and divalent ion concentrations less than about 2000 parts per million, or in formations containing water having salinity and hardness somewhat higher than this but which can be adjusted downward to the operable range by preconditioning the reservoir such as by injecting a quantity of lower salinity and lower hardness water into the formations to displace the higher salinity, higher hardness waters therefrom prior to injecting the surfactant solution into the formation. The foregoing equivalent weight ranges also apply to processes using complex combinations of petroleum sulfonate with synthetic surfactants which function as solubilizing co-surfactants for the purpose of rendering the petroleum sulfonate samples soluble in high salinity, high divalent ion concentration waters. Effective solubilizing co-surfactants include nonionic surfactants such as polyethoxylated alcohols or alkyl phenols; alkyl or alkylaryl polyethoxyl sulfates; or alkyl or alkylaryl polyethoxyethyl sulfonate.

DESCRIPTION OF THE PREFERRED EMBODIMENTS

We have found that the maximum oil recovery in surfactant flooding oil recovery processes is obtained if the petroleum sulfonate used in these oil recovery processes is a mixture of various molecular species of petroleum sulfonates, which may include monosulfonates, disulfonates, and polysulfonates, fallin in the relatively broad equivalent weight range, e.g. from about 250 to about 700, and if the distribution of equivalent weights within this range is relatively uniform. We have found that the average equivalent weight should be between 325 and 425 and preferably between 350 and 400. We have found the uniformity of the distribution of equivalent weights within these ranges is even more important than the average equivalent weight. From 40 to 70 percent of the molecular species of petroleum sulfonates should have equivalent weights of less than 400 and from 60 to 30 percent of these species should have equivalent weights of 400 and greater. It is preferred that from 15 to 35 percent of the petroleum sulfonates have equivalent weights less than 350; from 30 to 50 percent should have equivalent weights of 350 and greater but less than 500; and from 10 to 40 percent should have equivalent weights of 500 and greater. The especially preferred embodiment involves the use of petroleum sulfonates in which from 5 to 15 percent had equivalent weights less than 300; from 25 to 50 percent have equivalent weights of from about 300 to less than 400; from 15 to 25 percent have equivalent weights in the range of from about 400 to less than 500; and from 5 to 20 percent have equivalent weights of 500 and greater.

The process of our invention is best understood by reference to the following examples in which three commercially available petroleum sulfonates were examined, their equivalent weight distribution determined and each of the materials were tested for enhanced oil recovery effectiveness under conditions simulating a particular field being considered for an enhanced oil recovery program. The equivalent weight distributions were determined in 50 equivalent weight unit increments from 250 to 700, which encompassed all fractions of all of the samples tested. The data obtained together with the distributions according to the broader categories used for defining the preferred products for use in the process of my invention are contained in Table I. Values of oil recovery efficiency, $E_r$, are given in the last column.

TABLE I
EQUIVALENT WEIGHT DISTRIBUTION OF PETROLEUM SULFONATES AND OIL RECOVERY EFFICIENCY

| Run No. | Petroleum Sulfonate % A | % B | % C | Average Equivalent Weight | % of Sample in Indicated Equivalent Weight Range 250–<300 | 300–<350 | 350–<400 | 400–<450 | 450–<500 | 500–<550 | 550–<600 | 600–<650 | 650–<700 | $E_r$ $m^3/m^3$ |
|---|---|---|---|---|---|---|---|---|---|---|---|---|---|---|
| 1 | 100 | — | — | 330 | 21 | 28 | 32 | 18 | 1 | — | — | — | — | .20 |
|   |     |   |   |     | 21 | 60 |    | 19 |   |    | 0 |   |   |    |
|   |     |   |   |     |    |    |    |    |   |    | 0 |   |   |    |
| 2 |  —  | 100 | 0 | 500 | 49 | 81 | 4  | 51 | 9 | 52 | 13 | 7 | 3 | * |
|   |     |     |   |     |    | 8  |    |    |   | 19 |    |   |   |    |
|   |     |     |   |     |    |    |    | 17 |   |    | 75 |   |   |    |
|   |     |     |   |     |    |    |    |    |   |    | 75 |   |   |    |
| 3 | 50  | 50  | 0 | 415 | 8  | 12 | 18 | 13 | 9 | 88 | 6  | 3 | 2 | .52 |
|   |     |     |   |     | 11 | 18 |    | 11 | 5 | 26 |    |   |   |    |
|   |     |     |   |     | 11 | 36 |    | 34 |   |    | 37 |   |   |    |
|   |     |     |   |     |    |    |    | 16 |   |    | 37 |   |   |    |
| 4 |  —  |  —  | 100 | 415 | 29 | 47 | 6  | 74 | 11 | —  | —  | — | — | .40 |
|   |     |     |     |     | 6  | 3  |    | 85 |   | 53 | 0  |   |   |    |
|   |     |     |     |     | 6  | 9  |    | 91 |   |    | 0  |   |   |    |
| 5 | 76  | 24  | 0   | 370 | 37 | 15 | 24 | 14 | 3 | 15 | 4  | 2 | 1 | .62 |
|   |     |     |     |     | 15 | 22 |    | 17 |   | 85 |    |   |   |    |
|   |     |     |     |     | 15 | 46 |    | 41 |   |    | 22 |   |   |    |
|   |     |     |     |     |    |    |    |    |   | 39 | 22 |   |   |    |
| 6 | 88  | 12  | 0   | 350 | 43 | 61 | 28 | 16 | 3 | 6  | 2  | 1 | 1 | .57 |
|   |     |     |     |     | 18 | 25 |    | 19 |   |    |    |   |   |    |
|   |     |     |     |     | 18 | 53 |    | 47 |   | 29 | 10 |   |   |    |
|   |     |     |     |     |    | 71 |    |    |   |    | 10 |   |   |    |
| Preferred Ranges | — | — | — | 350–400 | — | — | 30–50 | 15–25 | — | — | — | — | — | NA |
|                  |   |   |   | 325–425 | 5–15 | 25–50 |    |    |    | 60–30 | 5–20 |   |   |    |
|                  |   |   |   |         | 15–35 | 40–70 |  | 15–25 |  |        | 10–40 |   |   |    |

*Water insoluble sample.

The oil recovery efficiencies as are contained in the last column of Table I were all determined in the following manner.

Sandstone cores from the formation being studied were obtained, and the cores were mounted for flooding operations and saturated with brine from the formation. The core was then resaturated with oil to attain as nearly as possible consistent oil saturations from one run to another and waterflooded until essentially no additional oil could be recovered from the core to simulate the oil saturation in the core at the conclusion of waterflooding. The porosity of these cores was 18.26 percent and the permeability was 106 millidarcies. 38.6 API gravity oil was utilized in all of the tests. The oil displacement tests were performed at approximately 100° F., which corresponds to the formation temperature. The brine utilized in the waterflood and for preparing the surfactant solution had a salinity of 130,000 parts per million total dissolved solids and 7,600 parts per million divalent ions, (total hardness), principally calcium and magnesium. Since the use of a solubilizing co-surfactant was mandatory at these high salinities, all of the tests for which the results are reported in Table I were performed utilizing 2 percent of the petroleum sulfonate or blend of petroleum sulfonate samples and 0.5 percent of a solubilizing co-surfactant which in this case was a sulfonated 5.0 mole ethylene oxide adduct of nonyl phenol. In all cases, the surfactant slug was followed with a viscous water drive comprising approximately 1,000 parts per million Kelzan polysaccharide in water.

Generally the broadest categorization, in which the desired petroleum sulfonate is defined in terms of the percent having equivalent weight less than 400 and the percent having equivalent weights of 400 and above, which roughly equates with the percent of a sample which is water soluble and percent which is oil soluble, are delineated in the last line for each sample. For example, from run 1 it can be seen that 81 percent of petroleum sulfonate sample A was comprised of molecular species having equivalent weights less than 400 and 19 percent had equivalent weights of 400 or greater. In run 2, Sample B, 12 percent were less than 400 and 88 percent were 400 or greater. In run 4, Sample C, 15 percent were less than 400 and 85 percent were 400 or greater. It can be seen that in every one of these three samples, there were present both oil soluble and water soluble species, although the relative balance of these materials was significantly different from one sample to another. Sample A was predominately water soluble materials while Sample B was predominately oil soluble. Sample C had a somewhat better distribution although it was still not within the preferred range as is indicated in the lower lines of the table. The sample of run 3 was formulated by physically mixing Samples A and B in an equal weight ratio to produce a petroleum sulfonate having an average equivalent weight of 415, and as can be seen, the resultant blend is well within the desired range insofar as the portion below and above 400 equivalent weight is concerned. Run 4 was performed using a commercial petroleum sulfonate whose average equivalent weight is 415 while the average equivalent weight of the petroleum sulfonate used in runs 3 and 4 was exactly the same, the equivalent weight distribution was not the same. The petroleum sulfonate of run 3 was within the first and second preferred range of our invention but not within the third, especially preferred range. The petroleum sulfonate of run 4 was not within any of our preferred ranges. As can be seen from the last column, the value of $E_r$ for run 3 was 0.52 and for run 4 was 0.40, clearly demonstrating that a petroleum sulfonate within our preferred ranges produces superior results to one not within any of the preferred ranges.

Run 5, utilized a petroleum sample within the especially preferred range, produced the best $E_r$ of any of the related tests. Run 6, which utilized a petroleum sulfonate which contained the greatest concentration of water soluble fractions, and was slightly outside of our preferred ranges, resulted in slightly lower $E_r$ than run 5.

In applying the process of my invention to a field, the following steps and fluids will ordinarily be employed.

If the petroleum sulfonates are to be used as essentially the only surface active agent present in the fluid, it is essential that the salinity of the formation water be less than about 20,000 parts per million total dissolved solids and that the divalent ion concentration be less than about 2,000 parts per million. If the formation water is naturally in the preferred range of salinity and hardness, no pretreatment of the formation may be necessary, insofar as salinity is concerned. If it is desired to utilize this process in a formation containing water having salinities somewhat higher than the foregoing limits, it is sometimes satisfactory to precondition the reservoir by preflushing with fresh water in order to displace the high salinity and/or high hardness waters from the flow channels of the formation prior to the injection of the surfactant system, so petroleum sulfonates can be utilized without solubilizing co-surfactants. The high salinity water in the formation is displaced more effectively if the fresh water preflush contains a minor amount of a hydrophilic polymeric viscosity increasing agent which assures effective displacement of the high salinity formation water.

In formations having salinities substantially greater than 20,000 parts per million total dissolved solids, it will be necessary to utilize a solubilizing co-surfactant in combination with the petroleum sulfonate as is defined by the process of my invention. Since these materials are defined more precisely in the prior art cited hereinabove, they will be treated only in general terms herein. Nonionic surfactants such as polyalkoxylated (usually polyethoxylated) alkanols or alkylphenols are effective if the salinity values are not greater than about 100,000 parts per million total dissolved solids and if the formation temperature is less than about 125° F. Alkyl or alkylaryl polyalkoxy (usually polyethoxy) sulfates are effective up to 200,000 parts per million total dissolved solids, but tend to hydrolyze if formation tempeatures are greater than 150° F. Alkyl or alkylaryl polyalkoxy alkyl sulfonates such as alkyl or alkylaryl polyethoxy ethyl or propyl sulfonates are effective in high salinity and high temperature environments and exhibit no tendency toward cloud points or hydrolysis with exposed temperatures higher than 150° F. and are the preferred solubilizing co-surfactants for use in high temperature, high salinity environments.

Ordinarily, the concentration of petroleum sulfonate in the surfactant-containing fluid in the process of my invention may be from about 0.05 to about 10 percent by weight and is preferably from about 0.2 to about 5.0 percent by weight. If a solubilizing co-surfactant is utilized in combination with the petroleum sulfonate, its concentration may be from about 0.1 to about 10 and preferably from about 0.3 to about 2.0 percent by weight. Ordinarily, the volume of surfactant solution should be expressed in terms of the pore volumes formation to be swept by the injected fluid, which is normally determinable by known reservoir engineering procedures. Generally from about 0.05 to about 2.0 pore volumes and preferably from about 0.2 to 1.0 pore volumes of surfactant fluid should be injected into the formation.

Other materials may be included in the preflush or the surfactant fluid or in both to accomplish desired purposes such as prevention of surfactant adsorption by the mineral surfaces. Certain inorganic salts such as sodium carbonate, sodium phosphate, sodium chloride, etc. are effective for this purpose, as are the polyphosphate wetting agents such as sodium acid pyrophosphate. Ligno-sulfonates are also useful for this purpose.

Once the desired volume of surfactant fluid is injected into the formation, it is preferred to follow the surfactant fluid with the injection of an aqueous fluid having a viscosity greater than the surfactant fluid or the formation petroleum in order to ensure effective volumetric displacement. Aqueous fluids containing hydrophilic polymers such as polyacrylamides, partially hydrolyzed polyacrylamides, polysaccharides, etc. are commonly used for this purpose. Ordinarily from 0.01 to 1.0 pore volumes of an aqueous fluid containing from 100 to 1,000 parts per million hydrophilic polymer is effective for this purpose. It is sometimes preferred to taper or gradually reduce the concentration of polymer with time in order to effect a smooth transition to the ultimate drive fluid which is ordinarily field brine or water.

Thus we have disclosed how an improved surfactant flooding enhanced oil recovery process may be achieved without appreciably increasing the cost of the surfactant fluid, simply by ensuring that the petroleum sulfonate is a mixture of petroleum sulfonates having a broad equivalent weight spectrum according to the percentages specified above. The resultant blend achieves higher oil recovery and when solubilizing co-surfactants are required, smaller amounts of these expensive chemicals are needed than when the blends of petroleum sulfonates having less even equivalent weight distribution.

While our invention has been described in terms employing a number of illustrative embodiments, these embodiments are disclosed for purpose of examples and disclosure only and are not meant to be in any way limitative or restrictive of the process or fluid of our invention, and it is our desire and intention that our invention be limited and restricted only by those limitations and restrictions as appear in the claims appended immediately hereinafter below.

We claim:

1. A method of recovering petroleum from a subterranean petroleum-containing formation penetrated by at least one injection well and by at least one spaced apart production well, said wells being in fluid communication with the formation, comprising:
   (a) injecting into the formation via the injection well an aqueous, saline fluid having a salinity greater than 20,000 parts per million total dissolved solids and containing a surfactant comprising petroleum sulfonates whose average equivalent weight is from 350 to 400, from 15 to 35 percent of said petroleum sulfonates having equivalent weights of 350 or less, from 30 to 50 percent of said petroleum sulfonates having equivalent weights greater than 350 and less than 500, and from 10 to 40 percent of said petroleum sulfonates having equivalent weights of 500 and above and a solubilizing co-surfactant selected from the group consisting of ethoxylated alkanols, ethoxylated alkylphenols, alkyl or alkylaryl polyethoxy sulfates, alkyl or alkylaryl polyalkoxyalkyl sulfonates, and mixtures thereof, said surfactant fluid displacing petroleum toward the production well; and
   (b) recovering petroleum displaced by the surfactant fluids from the formation and via the production well.

2. A method for recovering petroleum from subterranean, petroleum-containing formations penetrated by at least one injection well and by at least one spaced apart production well, both wells being in fluid communication therewith, comprising,
   (a) injecting into the formation via the injection well an aqueous, saline fluid having a salinity greater than 20,000 parts per million total dissolved solids and containing a surfactant comprising a mixture of petroleum sulfonates having an average equivalent weight from about 325 to about 425, at least from 5 to 15 percent of said petroleum sulfonates having equivalent weights less than 300 from 25 to 50 percent of said petroleum sulfonates having equivalent weights of 300 to less than 400, from 15 to 25 percent of said petroluem sulfonates having an equivalent weight of 400 to less than 500 and from 5 to 20 percent of said petroleum sulfonates having equivalent weights of 500 or above and a solubilizing co-surfactant selected from the group consisting of ethoxylated alkanols, ethoxylated alkylphenols, alkyl or alkylaryl polyethoxy sulfates, alkyl or alkylaryl polyalkoxyalkyl sulfonates, and mixtures thereof, said surfactant fluid displacing petroleum toward the producing well; and
   (b) recovering petroleum displaced by the surfactant fluid from the formation via the production well.

3. A method as recited in claim 2 wherein the average equivalent weight is from about 350 to about 400.

* * * * *